INVENTOR.
Bertil H. Clason
BY
George E. Johnson
ATTORNEY

United States Patent Office 3,366,089
Patented Jan. 30, 1968

3,366,089
VERTICAL SIGNAL INDICATOR SYSTEM
Bertil H. Clason, Flint, Mich., assignor to General Motors Corporation, Detroit, Mich., a corporation of Delaware
Original application Aug. 15, 1962, Ser. No. 217,079, now Patent No. 3,180,309, dated Apr. 27, 1965. Divided and this application Sept. 29, 1964, Ser. No. 400,069
2 Claims. (Cl. 116—116)

ABSTRACT OF THE DISCLOSURE

A system for indicating by the attained vertical position of a pointer located near the field of view of an operator that a predetermined value has been attained.

---

This invention relates to indicator systems and more particularly to indicator systems in which a pointer and dial are cooperatively related to supply a vertical indication of the extent of some value attained such as speed. The invention is herein illustrated as employed in speedometer systems for automobiles but it is obvious that the invention could be used in systems for indicating an extent of variable value or condition being measured other than speed such as pressure, elevation, flow of current in an electrical circuit, or a damper position, these being recited merely as examples. This is a division of the United States patent application Ser. No. 217,079 filed Aug. 15, 1962 now matured into Patent 3,180,309 granted April 27, 1965.

Audible and automatic speed warning devices have become common as accessories in modern automobiles. Such a device, as heretofore developed, requires a driver unduly to divert his attention from the road and watch his speedometer or constantly listen to the audible warning if he desires to maintain his speed at a predetermined or desired miles per hour rate.

An object of the present invention is to provide an improved indicator system requiring a minimum diversion of an operator's attention in the maintaining of a preselected speed or other value or condition.

To this end, the present invention contemplates the use of indicator means adapted to serve with maximum convenience, while vertically disposed, as a visual indicator that the extent of a value or condition as selected has been attained, the indicator means constituting two speedometers one of which is close to an operator's field of view and the other being a main graduated or dial instrument located away from that field of view but facing the same general direction as the one indicator for observation from the same vantage point.

These and other important features of the invention will now be described in detail in the specification and then pointed out more particularly in the appended claims.

Figure 1:
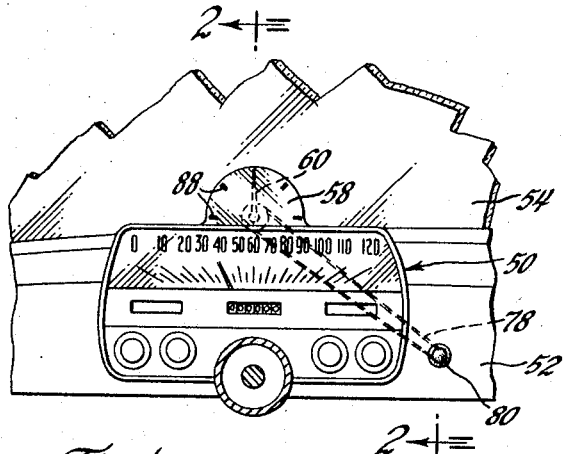
FIGURE 1 is an elevation view showing portions of an automobile instrument panel and windshield and illustrating one embodiment of the present invention.
Figure 2:
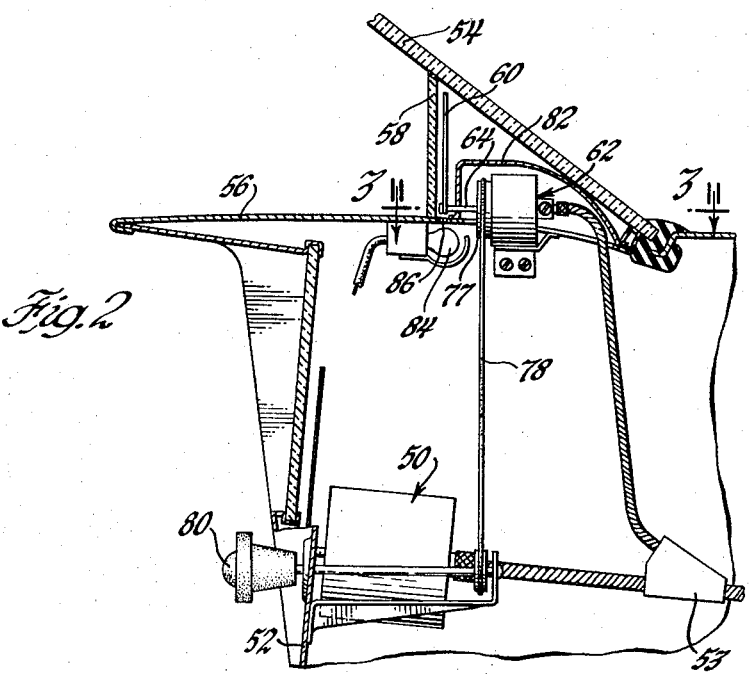
FIGURE 2 is an enlarged sectional view looking in the direction of the arrows 2—2 in FIGURE 1.
Figure 3:
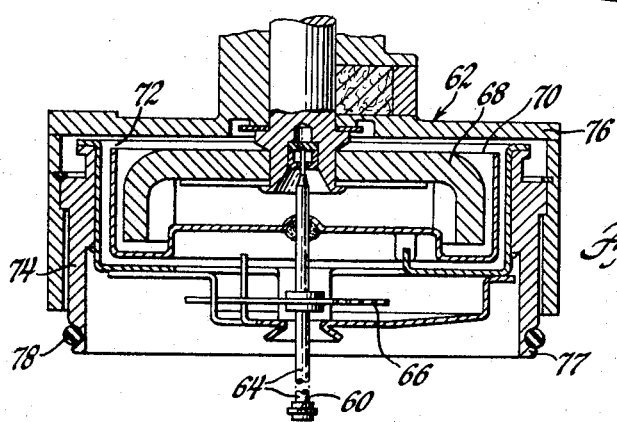
FIGURE 3 is a sectional view looking in the direction of the arrows 3—3 in FIGURE 2.

In FIGURES 1, 2, and 3, a main and standard type speedometer 50 is located in fixed nonrotative position on the automobile instrument panel 52 and is adapted in a conventional manner to give miles per hour readings.

A Y-connection 53 is shown through which two instruments are driven—in this case, two speedometers. Between a windshield 54 and a top shelf 56 of the panel 52 is located a vertical transparent window or fixed dial 58 through which a pointer 60 of a second speedometer or indicator 62 is observable to the operator. This pointer is fixed to the end of a shaft 64 of the speedometer to rotate therewith.

A hairspring 66 of more sensitivity than that of a standard speedometer is used in order to gain a larger angular sweep of the pointer 60. The usual magnet 68 and speed cup 70 are employed as taught in the United States Patent No. 2,627,401, granted Feb. 3, 1953, in the name of Henry H. Harada and entitled, "Speed Cup Bias Spring." The field cup 72 and casing 74, however, are rotatable within a fixed supporting casing 76 by means of a pulley 77 and a belt 78. The latter may be actuated by a hand-knob 80. An inner top casing 82 encloses the speedometer 62 and the pulley connection. A lamp 84 is so mounted as to illuminate the pointer 60 through an opening 86 in the shelf 56.

No calibration of the second speedometer 62 is needed other than that performed by the operator in actuating the knob 80. If the operator desires to go at thirty-five miles per hour, his regular speedometer 50 will tell when that speed is reached upon which he will turn the knob 80 until the pointer 60 is vertical. Reference marks 88 for straight up and down and at angles with the vertical aids the driver in maintaining a preselected speed or other than that conforming with but near that of the vertical position of the pointer 60.

I claim:

1. An indicator system on an automobile having a windshield above an instrument panel, said system comprising two speedometers mounted on said panel to face the same general direction, one of said speedometers being below the other and observable on said panel for readings from the driver's vantage point, the other speedometer being close to said windshield and having a fixed supporting casing and dial, a field cup rotatably mounted within said casing, a hairspring having one end attached to said field cup, a shaft coaxially mounted within said field cup and fixed to the other end of said hairspring, a pointer and a speed cup fixed to said shaft to rotate therewith, said pointer being observable from said vantage point and said speed cup being coaxially mounted within said field cup, a magnet coaxially mounted within said speed cup, a common rotational driving means connected to said one speedometer and said magnet, said hairspring being of such sensitivity as to act on said pointer over a speed range smaller and within that covered by said one speedometer, and means connected to said field cup for rotating said field cup and said one end of said hairspring relative to said fixed supporting casing whereby a vertical reading of the position of said pointer will conform with a preselected reading on said one speedometer within said smaller speed range.

2. An indicator system as set forth in claim 1, said means connected to said field cup being a manually rotatable knob and driving means connecting said knob to said field cup, and said knob being mounted on said panel at a lever lower than that of said other speedometer.

(References on following page)

References Cited

UNITED STATES PATENTS

| | | | |
|---|---|---|---|
| 1,754,954 | 4/1930 | Johnson | 244—1.3 |
| 1,760,857 | 5/1930 | Berg | 73—498 |
| 2,112,704 | 3/1938 | Mackay | 116—129 |
| 2,549,754 | 4/1951 | Bosch | 73—498 |
| 2,579,806 | 12/1951 | Dvorkin | 116—57 |
| 3,180,309 | 4/1965 | Clason | 116—116 |
| 3,247,724 | 4/1966 | Powell | 73—498 |

FOREIGN PATENTS 1,035,163   4/1953   France.

LOUIS J. CAPOZI, *Primary Examiner.*